United States Patent [19]

Westover

[11] 4,208,441
[45] Jun. 17, 1980

[54] PROCESS FOR COOKING DOUGH PRODUCTS

[75] Inventor: Jack D. Westover, Burnsville, Minn.

[73] Assignee: The Pillsbury Company

[21] Appl. No.: 882,502

[22] Filed: Mar. 1, 1978

[51] Int. Cl.$^2$ .............................................. A21D 8/06
[52] U.S. Cl. ................................... 426/293; 426/297; 426/302; 426/468; 426/505; 426/514; 426/524; 99/386
[58] Field of Search ................. 426/94, 289, 549, 293, 426/446, 468, 502, 505, 391, 296, 524, 302, 297, 514; 99/372, 427; D7/87, 88, 89

[56] References Cited

U.S. PATENT DOCUMENTS

| | | | |
|---|---|---|---|
| 1,663,719 | 3/1928 | Morley | 426/549 |
| 2,765,725 | 10/1956 | Pearce | 99/372 |
| 2,936,697 | 5/1960 | Kueser | 99/372 |
| 3,379,141 | 4/1968 | Groth | 426/502 |
| 3,879,564 | 4/1975 | Cocozzella | 426/549 |
| 4,046,920 | 9/1977 | Moline | 426/391 |

*Primary Examiner*—Raymond N. Jones
*Assistant Examiner*—Elizabeth A. Hatcher
*Attorney, Agent, or Firm*—Mart C. Matthews; Robert J. Lewis; Michael D. Ellwein

[57] ABSTRACT

A method and apparatus for cooking food products such as flat sheets of dough is described. The apparatus includes a plurality of mating pocketed cooking irons mounted upon endless conveyors, electric or gas burners for heating the irons and a drive motor for the conveyor. Each mating pair of irons includes an upper iron provided with upwardly extending, downwardly opening recesses or pockets to engage the top of the food product being cooked and a lower iron with downwardly extending pockets. The food products expand into these pockets to form, in many cases, hollow blisters therein as the food product expands. Briefly, the method employed is to place a sheet of dough between the hot irons, close the irons by bringing their edges into contact and heat the dough therein until it expands into the pockets and is cooked sufficiently to set the crumb structure. The cooked or baked dough pieces, which can be used as pizza shells, are then topped, frozen and packaged for shipment.

9 Claims, 5 Drawing Figures

PROCESS FOR COOKING DOUGH PRODUCTS

FIELD OF THE INVENTION

The invention relates to food processing systems and more particularly to a method and apparatus for cooking, baking or frying sheets of dough.

THE PRIOR ART

One important use for the present invention is the preparation of cooked dough products such as pizza shells and the like. Accordingly, the invention will be described by way of example in connection with pizza shell production and particularly in connection with the large scale production of complete pizzas suited for distribution in a refrigerated or frozen condition to retail stores, vending machines, etc. The invention can, however, also be used for preparing other foods such as cooked dough shells topped with icing, cinnamon and sugar, fruit jam, cheese, quiche lorraine, etc.

Certain dough products, such as pizza shells, because of their relatively large size are easily damaged if fried in fat or baked in an oven. For example, if a pizza shell is touched by machine parts at the wrong time or jarred, it can be deformed or torn. Moreover, if it is fried, the forward motion of the conveyor used to transport the pizza shells through the heated fat will sometimes bend the pizza shells and cause them to fold near the center. When this happens, the leading edge of the pizza shell will be folded downwardly onto itself. Even if it does not stick together, the folded dough shell will be ruined and must be discarded.

Ordinary baking ovens also have deficiencies such as their large size, high cost and energy requirements. In addition, they are not adapted to form or mold the dough sheets as the dough sheets bake. Thus, the dough sheets, e.g., pizza shells, have a random surface contour and thickness after baking.

OBJECTS

The major object of the invention is to provide an improved cooking method and apparatus for dough pieces such as flat sheets of dough with provisions for: (a) conveying the dough from inlet to outlet in a controlled time interval; (b) provision for cooking and simultaneously molding dough pieces to selected shape; (c) a means for securely and reliably engaging each food product and allowing it to expand into upper and lower expansion pockets; (d) provision for preventing large, flat or delicate food products such as dough sheets from being folded as they are carried through the equipment; (e) a provision for handling and conveying delicate, soft dough products from an inlet to an outlet without damaging them; (f) the provision of a cooker that uses less energy than a baking oven; (g) the provision of a means for cooking or frying dough sheets so as to form a plurality of blisters therein of predetermined size and shape.

In the accomplishment of the foregoing and related advantages and objectives, the invention then comprises the features hereinafter fully described and particularly pointed out in the claims, the following description setting forth in detail certain illustrative embodiments of the invention by way of example, these being indicative, however, of but a few of the various ways in which the principles of the invention may be employed.

THE FIGURES

SUMMARY OF THE INVENTION

A method and apparatus for cooking food products such as flat sheets of dough is described.

The apparatus includes a plurality of mating pocketed cooking irons preferably mounted upon endless conveyors, electric or gas burners for heating the irons and a drive motor for the conveyor. Each pair of mating irons includes an upper iron provided with pockets. These pockets extend upwardly and open downwardly to engage the top of the food product being cooked and a lower iron preferably provided with downwardly extending pockets. The food products expand into these pockets to form, in many cases, hollow blisters therein as the food product expands.

Briefly, the method employed is to place a sheet of dough, preferably proofed dough, between the hot irons that are first preferably covered with oil, close the irons by bringing their edges into contact and heat the dough within the irons until it expands into the pockets and is cooked sufficiently to set the crumb structure. The cooked or baked dough sheets provide an improved pizza shell which is then topped, frozen and packaged for shipment.

More specifically, the invention provides a baking, cooking or frying process, an automated high volume production process for preparing foods, such as frozen pizza for distribution from retail or vending outlets, etc. The process comprises providing a sheet of dough preferably a proofed circular or rectangular dough sheet. The dough sheet can be made in any suitable manner as by stamping, sheeting and cutting or by the pressing a ball of dough into a flat circular disc. Before cooking, the dough sheet is preferably docked, i.e., holes are punched through it. The cut sheets can have any selected shape such as rectangular, circular, etc.

The dough sheet is confined during baking between a pair of cooking irons heated sufficiently to cook the dough throughout and brown its surfaces. The irons are preferably covered with oil, thereby in effect frying the dough. The irons are provided with a plurality of recesses, preferably dome shaped so that during heating of the dough the dough sheet expands into the recesses to define blisters in the surface. In this way, the dough is confined by the irons to regulate the maximum thickness of the finished cooked dough pieces. As the bumps or projections form, a hollow cavity usually also forms within each blister. The cooked dough sheet is then preferably cooled below 150° F. After cooling, a topping is applied and the topped product is then frozen for shipment or storage.

DETAILED DESCRIPTION OF THE INVENTION

Figure 1:
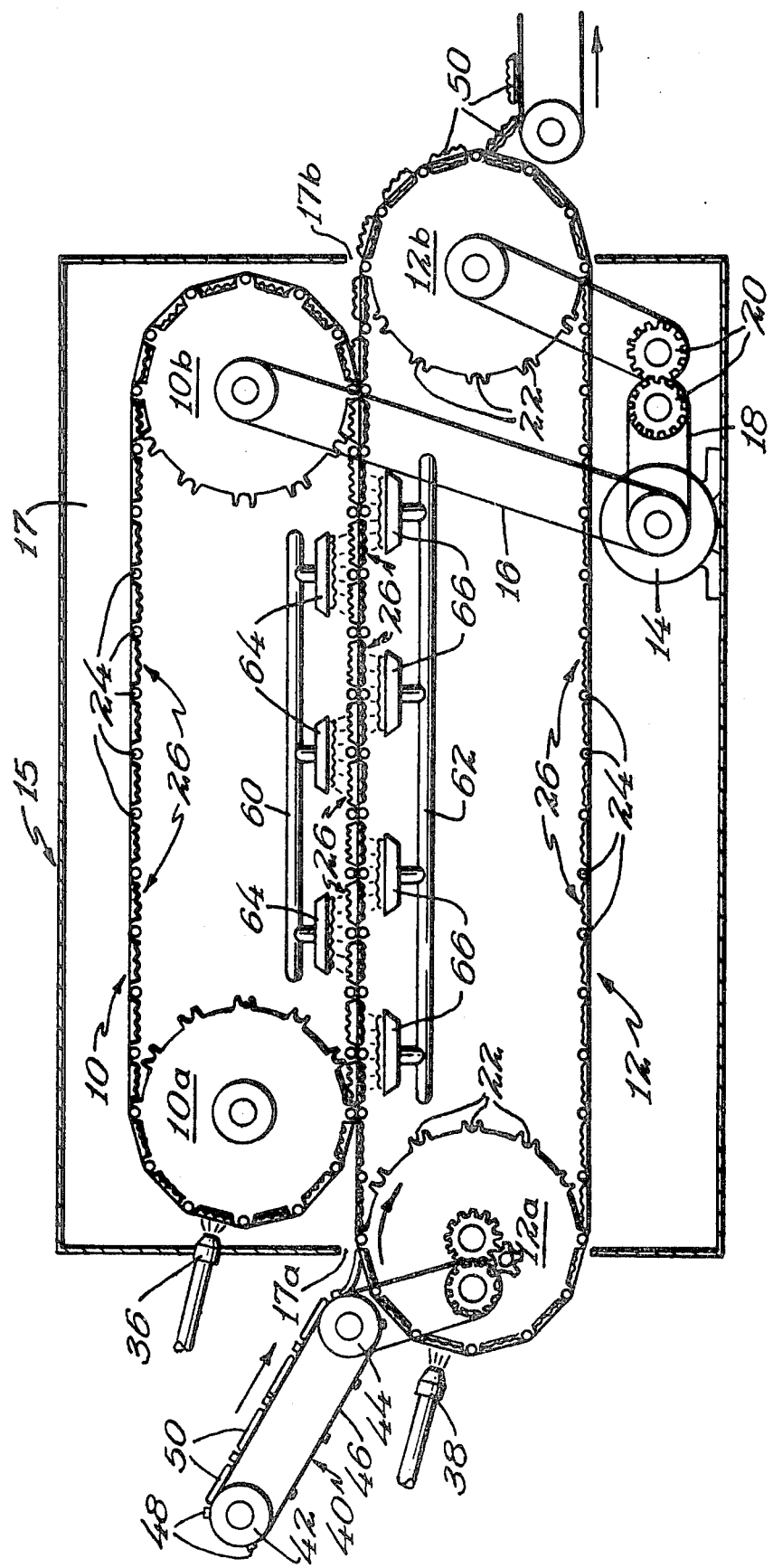
FIG. 1 is a semidiagrammatic side elevational view of a cooker in accordance with one preferred form of the invention.

FIG. 1 depicts in diagrammatic form a preferred apparatus for preparing cooked or baked food products in accordance with the invention. The apparatus includes upper and lower conveyors designated 10 and 12, each comprising a pair of laterally spaced drive sprockets 10a and 10b, 12a and 12b, respectively, with the former mounted in parallel longitudinally spaced positions above and somewhat closer together than the other pair suitably journaled for rotation upon the framework of cooker 15. The cooker 15 includes six walls to form a rectangular cooker housing having an oven cavity 17 therein with an inlet opening 17a at the left and an outlet opening 17b at the right. It will be seen that the conveyor 12 extends through these openings to allow food products to be fed between the upper and lower conveyors and removed from the lower conveyor as will be described more fully below. Both conveyors 10 and 12 are driven by a drive motor 14 connected via chain and sprocket assembly 16 to the conveyor 10 and by means of a chain and sprocket assembly 18 to conveyor 12 through the reversing gears 20. Conveyor 12, therefore, runs in the opposite direction but at the same speed as conveyor 10. In this way, the lower run of the conveyor 10 and the upper run of conveyor 12 will travel in the same speed and direction. As shown in FIG. 1, the sprockets 10a to 12b are provided with radially spaced apart recesses 22 to engage and locate pivot pins 24 connecting hinges 28 between food molding plates or irons 26.

Figure 3:
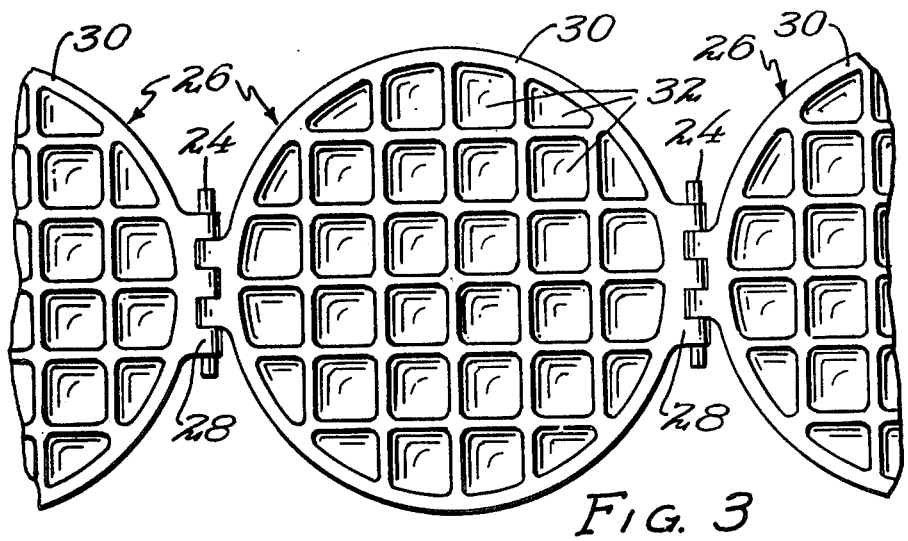
FIG. 3 is a horizontal cross-sectional view taken on line 3—3 of FIG. 2.
Figure 2:
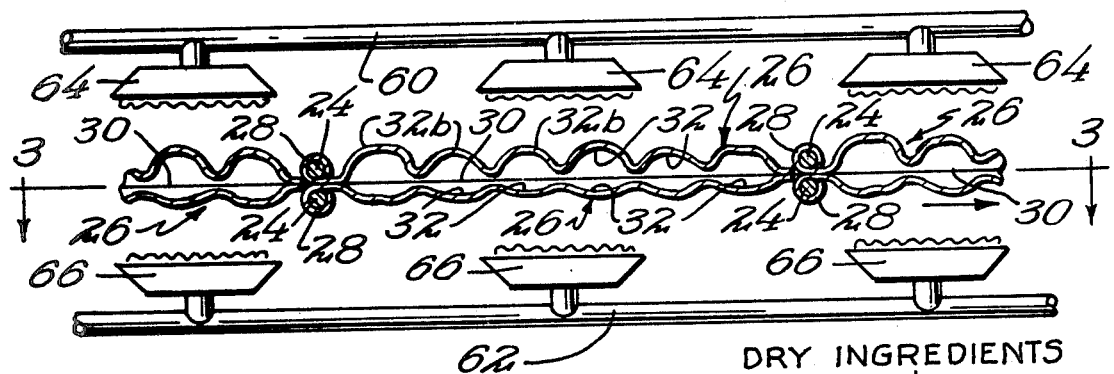
FIG. 2 is a partial enlarged vertical sectional view of several food product cooking irons of FIG. 1.

As can be seen in FIG. 1–3, the upper and lower conveyors 10 and 12 include a plurality of food cooking irons 26 resembling waffle irons and having hinges 28 which are connected by hinge pins 24 to form endless chains entrained over the sprockets 10a, 12a and 12b respectively. It should be noted that the lower run of the conveyor 10 is aligned with and engaged with the upper run of conveyor 12 so that the corresponding upper and lower iron halves are located in mating position, that is to say, with their edges both in contact and in alignment as best shown in FIG. 2. The alignment is maintained during operation by driving the upper and lower sprockets from the same motor 14. Other alternative synchronizing means can be provided if desired.

The upper irons 26 as seen in FIGS. 2 and 3 have a flat peripheral edge portion 30 which faces downwardly. The flat edges 30 face upwardly in the case of the lower irons. The peripheral edge 30 is circular in this case but can have any desired shape such as rectangular, etc., the important thing is that the mating upper and lower irons are of the same shape so that their edges 30 are in alignment and preferably in contact when they are located between sprockets 10a and 10b. Each of the irons also includes a plurality of pockets 32 that can be arranged in rows and columns as shown in FIG. 3 or in random position if desired. Pockets 32 are generally hemispherical in shape as seen in cross-section, e.g., in FIG. 2. The pockets can be of random height but the height of the deepest pocket 32b of FIG. 2 is controlled so that the maximum thickness of the finished dough shell is maintained within predetermined limits.

The pockets 32 of the upper conveyor 10 extend upwardly and open downwardly while those of the lower conveyor extend downwardly and open upwardly. The pockets 32 in corresponding mating irons need not be in vertical alignment and in fact, the number of pockets need not be provided in the mating irons. For example, the upper iron may have 30 pockets and the lower iron may have 25 pockets located in different positions, i.e., positions that do not correspond with the pockets located immediately above them.

While it is not essential, it is preferred that the irons be suitably coated with an edible oil or other shortening applied for example by means of spray gun 36 or 38 (FIG. 1). The oil coats the inside surfaces of the cooking irons before any product is placed between them. The oil or fat applied through the spray nozzles 36 and 38 partially adheres to the surface of the cooked dough shells and helps provide a moisture repellent surface layer which reduces sogginess that results from the moisture penetration from the topping into the finished cooked or fried product.

Located at the left end of the apparatus immediately above the sprocket 12a and adjacent the inlet 17a is an infeed conveyor 40 including longitudinally and vertically spaced sprockets 42 and 44 suitably journaled for rotation in a clockwise direction as seen in FIG. 1. Entrained over the sprockets 42 is a slat conveyor 46 having slats 48 to locate food products 50 which, in this case, comprise flat sheets of proofed dough 10″ in diameter. The conveyor 46 is suitably driven and synchronized with the conveyors 10 and 12, in this case by means of a gear and sprocket assembly 52 coupled between them. In this way the conveyor 46 will dump each successive dough sheet 50 so that it is centered precisely on one of the lower irons 26 as shown in FIG. 1. It should be understood that the conveyor 46 can be synchronized with conveyors 10 and 12 by other means such as an independent drive operated by a controller of suitable known construction (not shown) that is in turn regulated by the speed of the conveyors 10 and 12. Mounted upon oven frame elements 60 and 62, respectively, are a plurality of longitudinally spaced apart upper and lower burners 64 each of which faces the adjacent cooking irons 26. The upper burners face downwardly and the lower ones face upwardly. While gas burners are preferred, any other commercially available heating means such as electric heaters, etc. can be used as required. If desired, an electric heater can be mounted directly on the external surface of each iron 26. The heaters 64, 66 should heat the irons up to the proper cooking temperature, e.g., about 300° F.–600° F.

The cooking plates or irons 26 can be of any size but typically are from about 3″ in diameter to about 14″ in diameter, and are preferably circular in shape as seen from above when used for preparing pizza shells. The recesses 32 preferably have a height between about ½ and 1″. Those in the top plate 26 would typically average about ¾″ in height and those in the bottom, preferably less, about ¼″ in height. A distance between each of the recesses 32 is preferably 1 or 2″. Excellent results have been obtained with the recesses 32 about 1.25″ apart. The cooking time and temperature can be varied widely but good results are obtained if the irons are heated to about 400° F. and cooking is from about 30 seconds to 1.5 minutes. Oil applied to the inside surfaces of the cooking irons can comprise any edible oil or melted shortening such as soy oil.

It can be seen that during operation the proofed dough pieces 50 are carried downwardly in succession and upon reaching the end of the conveyor 40, fall into place in the center of one of the irons 26. They are thereafter carried from left to right between mating upper and lower cooking irons 26.

Figure 4:
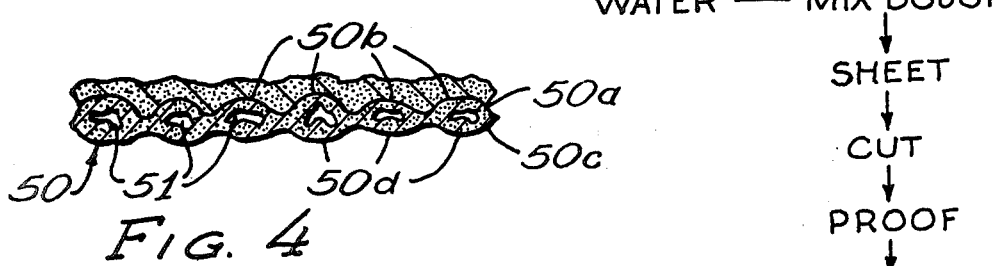
FIG. 4 is a vertical sectional view of a finished food product.

As the dough pieces pass through the apparatus between sprockets 10a-10b, the heat expands and cooks or bakes them. Expansion of dough frequently causes blisters such as blisters 51 (FIG. 4) to form in the finished piece. It will be seen that the upper surface 50a includes a plurality of bumps or blisters 50b which correspond to the recesses 32 while the lower surface 50c includes a plurality of bumps or downwardly extending blisters 50d correspond to the recesses or pockets 32 in the lower set of irons 26. The blisters 50b are thus generally hemispherical in shape. In most of them is a cavity 51.

It is preferred that the pockets 32 and the lower irons 26 are shallower than those in the upper iron 26. The upper or lower set of irons can be flat, if desired.

Figure 5:
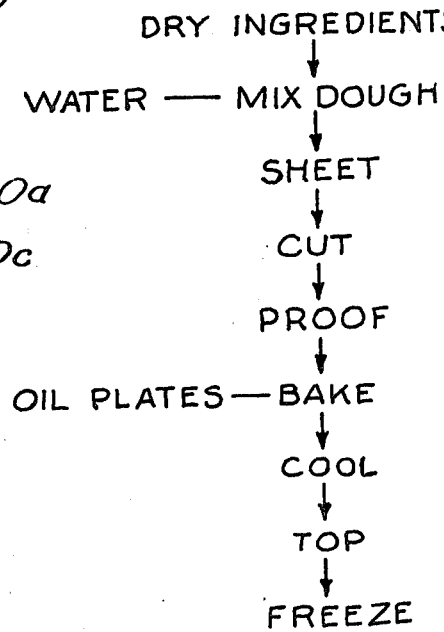
FIG. 5 is a flow chart of a preferred process in accordance with the invention.

Refer now to FIG. 5 which depicts a flow chart illustrating one preferred method of producing the invention. As a first step in the process, dough is prepared by mixing dry ingredients and water or milk conventionally to form a finished dough. The dough can comprise any good brand of pizza dough. Dough utilizing wheat flours is highly preferred. The term "pizza dough" used herein has the same meaning as bread dough but it should be understood that a preferred pizza dough is one with a relatively high flour protein content. However, since the bread and pizza dough formulas overlap to some extent, no specific formula limitations are intended by the use of the term "pizza dough". Some other doughs can be used such as pastry dough and particularly pastry dough that contains yeast and/or chemical leavening.

The dough, after being prepared, is rolled or otherwise formed into sheets using any conventional well-known equipment such as a roll stand having one or more sets of cooperating or vertically spaced parallel horizontally disposed driven rolls. If desired, the dough sheets can be prepared by stamping them from dough balls. In such a case, cutting the sheet to circular shape is unnecessary. The term "sheet" means a flat piece formed by any means whatsoever. After mixing and before sheeting, the dough is allowed to rest at room temperature for about 40 minutes to provide time for yeast development, dough texture changes and leavening gas development. Once the dough has been sheeted to the desired thickness, generally 2-10 mm but preferably to about 4-6 mm thick, the dough is docked by piercing it with pins about ⅛" in diameter throughout its width and breadth. Good results are achieved by spacing the pins about 1" apart. The sheeted dough is then cut into pieces of any desired shape and proofed typically at 115° F. for 5 minutes in an atmosphere of 80-90% relative humidity to allow the dough to rise. Each dough piece or sheet is a self-supporting, non-liquid pliant piece of dough having upper and lower surfaces, a predetermined width and breadth, i.e., diameter if circular and a peripheral edge that is closed upon itself. Each piece 50 has enough internal strength to be lifted, carried, or otherwise handled.

The cut and proofed product is then placed between the cooperating baking irons which are then closed over them. The baking irons are preferably at a temperature of about 300° F.–500° F. Cooking can be accomplished typically in about 0.5–2 minutes when the irons are at that temperature.

As described above, the irons are provided with a plurality of recesses or pockets into which the dough can expand as it cooks. After the irons are closed, the dough expands rather quickly forming a plurality of blisters as it swells into the recesses. An important advantage of the invention is that the maximum height of the highest blisters and the overall thickness of the dough pieces is reliably controlled by the cooking irons, e.g., by reducing the height of the cavities in the upper cooking irons.

After cooking, the finished dough shell is preferably allowed to cool before the topping is applied. The finished dough body, or shell as it is often called, is relatively crisp and somewhat firm on the outside. The inside, however, is moist, soft and bready or bread-like in texture. Like other bread products, it is porous, but it may or may not contain hollow cavities or blisters. The term "shells" herein does not mean shaped like a sea shell. It is instead used herein as it is commonly used to describe the flat bread utilized as the base of a pizza. It is preferred to cool the cooked product at least below the softening point of the components used in the topping. If cheese is used as a part of the topping, it is best to cool the dough shell to 150° F. or below and even better, to room temperature, i.e., 70° F. or below before topping is applied. It was found that by cooling the cooked dough shell before adding the topping, several important benefits are obtained. First, the fat applied to the cooking irons prior to baking tends to be less penetrable by moisture contained in the topping. The moisture in the topping therefore has less tendency to make the dough shell soggy. In addition, the topping is not melted or heated by the hot crust which, if allowed to occur, will reduce the viscosity of the topping allowing it to flow more readily into pores or openings in the crust. Finally, cooling the oil or fat on the surface of the dough shell helps to prevent the formation of peroxides and free fatty acids, the primary causes of fat rancidity.

After the topping is applied, the product is complete. If local distribution is desired, the product can be distributed at room temperature and needs only to be heated in the oven by the housewife. If wider distribution is desired, the product is frozen, packaged and distributed in a frozen condition. Freezing is greatly preferred since freezing cooperates with the layer of fat adhering to the surface of the dough shell to prevent moisture migration from the topping to the crust.

The invention will be better understood by reference to the following examples.

EXAMPLE 1

Dough is prepared using the following weight percent formula:

Wheat Flour—60.65
Water—36.04
Dry Yeast—1.28
Salt—0.93
Dough Conditioner (sodium stearoyl 2 lactylate)—0.3
Soy Oil—0.8

The ingredients are weighed and placed in the mixer which is run at low speed for two minutes and high speed for four minutes. The dough is then dumped into an oiled trough and allowed to rest for 40 minutes. After mixing, the dough temperature is 85° F. The dough is then sheeted to a thickness of 3 mm inches, docked with ⅛" diameter docking pins set at 1" apart and cut into circular pieces 10" in diameter weighing 170 gms. each. The pieces are conveyed through a proofer and proofed for five minutes at 115° F. They are then placed between heated irons and baked at 400° F. for 30 seconds. The resulting dough shells are generally flat and contain a moist, tender bready interior having pores many of which are in the range of 1/32" to 1/16" in diameter. The surface is a relatively dense crust containing a layer of absorbed fat. The dough shells contain a plurality of upwardly extending generally dome shaped hollow bumps or blisters having a predetermined maximum height. The average maximum height of a large number of these pizzas is about 0.8 inches. The cavities inside the blisters are usually over ten times greater in diameter than the pores and many were up to about ¾" in height. Ligaments of cooked bready dough are present between the blisters. Hard cooked rivit-like dough rings are present around the docking holes. The finished shells are passed through a cooler at a temperature of 35° F. until their temperature has reached 50° F. A pizza topping is then applied and the complete pizzas are frozen.

EXAMPLE 2

Prepare dough shells as in Example 1 except that wheat flour content is 55% by weight, water is 40% by weight, no oil is used, and yeast is 4.5% by weight. This dough, because of the high water content is rather soft for processing but blisters develop very well and the texture is more bready than Example 1.

EXAMPLE 3

Compound dough as in Example 1 except that the wheat flour content is 68% by weight, water is 30% by weight, yeast is 1%, soy oil is 0.5% and seasoning comprises 0.5%. The dough is less sticky and more firm than in Example 2 but blisters are smaller and more crackery in texture.

Mix the dough as in Example 1 except that the water content is 40% by weight, flour is 55% by weight, yeast is 2%, salt 0.5% by weight, soy oil is 2.5%. The dough is similar to that in Example 1.

EXAMPLE 4

Prepare dough as in Example 1 except that the amount of flour is 68% by weight, water is 26% by weight, soy oil is 2%, dry yeast 2%, emulsifier is 0.2% and the balance is seasoning. This dough is fairly dry and blisters are smaller than in Example 1.

EXAMPLE 5

Pizzas are prepared as in Example 1 except that melted butter is applied to the top of the dough shells and a mixture of cinnamon and sugar is sprinkled over them.

EXAMPLE 6

Pizzas are prepared as in Example 1 except that cooking is carried out at 400° F. for 40 seconds.

EXAMPLE 7

Cooking is carried out as in Example 6 except that cooking is carried out at 375° F. for 60 seconds.

In a second run, cooking is carried out at 425° for 30 seconds.

EXAMPLE 8

Dough shells are prepared as in Example 1 except that instead of applying the pizza topping, a sugar glaze is applied to the top crust of the finished shells.

EXAMPLE 9

Dough shells are prepared as in Example 1 and divided into two batches. A fruit topping is applied to one batch and jelly is applied to the second batch. The finished products are frozen after being topped.

What is claimed is:

1. A continuous process for cooking dough product comprising mixing together flour, water and leavening to form a dough; forming the dough into a plurality of self-supporting pliant dough sheets of predetermined width and breadth, each sheet having upper and lower surfaces and a peripheral edge that is closed upon itself and having enough internal strength to be lifted, carried or otherwise handled; providing upper and lower endless moving conveyors comprising a plurality of cooking irons connected adjacent one another along the run of said conveyors, the positioning and movement of said conveyors acting to bring each cooking iron of the upper conveyor in turn into a superimposed mated position with a corresponding cooking iron of the lower conveyor, said position being between prior and subsequent positions wherein said upper and lower cooking irons are separated, each pair of cooking irons being of a size adapted to hold the sheet, at least one of the irons having pockets which extend away from the other iron; maintaining the irons at a high enough temperature to cook the dough; applying edible oil to at least one of the dough sheets and the cooking irons prior to closing the irons on a respective dough sheet; depositing each dough sheet in turn on a lower cooking iron while in separated relationship, the movement of said cooking irons first closing the irons into mating relationship around the dough sheet to thereby heat the dough between them until it expands into the pockets of the irons and is cooked sufficiently to set the dough crumb structure to provide a cooked dough body having a crisp, relatively firm exterior and a soft, moist, bready interior and having blisters corresponding in size and shape to the pockets in the cooking iron, and thereafter separating the irons; and removing the cooked dough sheet.

2. The process of claim 1 wherein the cooked dough product comprises a pizza shell and the pizza shell is then topped with a pizza topping, frozen and packaged for shipment.

3. The process of claim 2 wherein the pizza shells are cooled to 150° F. or below prior to the application of the pizza topping.

4. The process of claim 1 wherein shortening is applied to the surface of the dough sheet to reduce the permeability of the dough sheet to moisture contained in a food topping whereby the moisture in the topping has less tendency to make the dough sheet soggy.

5. The process of claim 4 wherein the shortening is applied to a surface of the cooking irons prior to insertion of the dough sheet between the cooking irons.

6. The process of claim 1 wherein the dough sheets are pierced with docking pins prior to being inserted between the cooking irons.

7. The process of claim 1 wherein hollow cavities form within the dough corresponding in position to the recesses in the cooking irons as the dough expands into recesses within the cooking irons.

8. The process of claim 1 wherein the dough sheet is proofed by placing it in a warm environment prior to being placed between the cooking irons.

9. The process of claim 1 wherein the dough sheet is proofed by placing it in a warm environment prior to introducing the dough sheet between the cooking irons, shortening is applied to the surface of the dough sheet to reduce the permeability of the dough sheet to moisture contained in a food topping whereby the moisture in the topping has less tendency to make the dough shell soggy, the dough sheets are pierced with docking pins prior to being inserted between the cooking irons and as the dough expands into the recesses within one of the cooking irons, hollow cavities form in the dough corresponding in position to the recesses in the cooking iron, and the cooked dough product comprises a pizza shell and the pizza shell is cooled to 150° F. or below and is then topped with a pizza topping, frozen and packaged for shipment.

* * * * *